United States Patent
Philpott et al.

(10) Patent No.: US 8,762,564 B1
(45) Date of Patent: Jun. 24, 2014

(54) METHOD AND SYSTEM FOR DYNAMICALLY SELECTING, ASSEMBLING AND INSERTING CONTENT INTO STREAM MEDIA

(71) Applicant: mDialog Corporation, Toronto (CA)

(72) Inventors: Gregory Robert Philpott, Toronto (CA); Indravadan Vipinbhai Patel, Toronto (CA); Christopher Gary Dinn, Toronto (CA)

(73) Assignee: mDialog Corporation, Toronto (CA)

( * ) Notice: Subject to any disclaimer, the term of this patent is extended or adjusted under 35 U.S.C. 154(b) by 6 days.

(21) Appl. No.: 13/938,816

(22) Filed: Jul. 10, 2013

(51) Int. Cl.
*G06F 15/16* (2006.01)
*H04L 29/06* (2006.01)

(52) U.S. Cl.
CPC .................................. *H04L 65/604* (2013.01)
USPC ........... 709/231; 709/230; 709/217; 709/218; 709/219; 709/246

(58) Field of Classification Search
USPC .......................... 709/230, 231, 217–219, 246
See application file for complete search history.

(56) References Cited

U.S. PATENT DOCUMENTS

| | | | |
|---|---|---|---|
| 6,792,047 B1 | 9/2004 | Bixby et al. | |
| 7,548,565 B2 | 6/2009 | Sull et al. | |
| 8,145,782 B2 | 3/2012 | McGowan et al. | |
| 2004/0158858 A1* | 8/2004 | Paxton et al. | 725/42 |
| 2004/0237102 A1 | 11/2004 | Konig et al. | |
| 2007/0089126 A1 | 4/2007 | Fritz et al. | |
| 2007/0220566 A1 | 9/2007 | Ahmad-Taylor | |
| 2008/0092168 A1* | 4/2008 | Logan et al. | 725/44 |
| 2008/0274752 A1 | 11/2008 | Houri | |
| 2009/0049090 A1 | 2/2009 | Shenfield et al. | |
| 2009/0077580 A1 | 3/2009 | Konig et al. | |
| 2010/0037204 A1 | 2/2010 | Lin et al. | |
| 2010/0124907 A1 | 5/2010 | Hull et al. | |
| 2010/0228880 A1 | 9/2010 | Hunt et al. | |
| 2011/0145858 A1 | 6/2011 | Philpott et al. | |
| 2011/0265116 A1 | 10/2011 | Stern et al. | |

(Continued)

FOREIGN PATENT DOCUMENTS

| | | |
|---|---|---|
| CA | 2574998 A1 | 2/2006 |
| WO | 2011150293 A1 | 12/2011 |
| WO | 2012074762 A1 | 6/2012 |

OTHER PUBLICATIONS

Related PCT Application No. PCT/CA2013/000379 Search Report dated Jul. 15, 2013.

(Continued)

*Primary Examiner* — Edward Kim
(74) *Attorney, Agent, or Firm* — Perry + Currier (57) ABSTRACT

A novel method and system is provided for dynamically selecting, assembling and inserting content into streaming media. The system and method allow for the selection of the content to be inserted into a streaming media program to be performed after the manifest, or equivalent, defining the streaming media program has been provided to a rendering device and to allow the selection of multiple pieces of content to fill a defined insertion point duration, provided only that the total duration of the selected pieces of content equal the duration of the defined insertion point. Selected pieces of content to be inserted are assembled by the system and method into an assembled emulated single piece of content which removes the need for discontinuity indicators, or equivalents, to be placed in the manifest between the selected pieces of content.

19 Claims, 3 Drawing Sheets

(56) References Cited

U.S. PATENT DOCUMENTS

| | | |
|---|---|---|
| 2011/0302307 A1 | 12/2011 | Zhong et al. |
| 2011/0307623 A1* | 12/2011 | George et al. ................ 709/231 |
| 2011/0307781 A1* | 12/2011 | Sood et al. ................... 715/716 |
| 2012/0005313 A1 | 1/2012 | McGowan et al. |
| 2012/0030313 A1 | 2/2012 | McGowan et al. |
| 2012/0042050 A1* | 2/2012 | Chen et al. ................... 709/219 |
| 2012/0042089 A1* | 2/2012 | Chen et al. ................... 709/231 |
| 2012/0042090 A1* | 2/2012 | Chen et al. ................... 709/231 |
| 2012/0047542 A1* | 2/2012 | Lewis et al. .................... 725/97 |
| 2012/0059721 A1 | 3/2012 | Blegen |
| 2012/0066285 A1 | 3/2012 | McGowan et al. |
| 2012/0066386 A1 | 3/2012 | McGowan et al. |
| 2012/0072465 A1 | 3/2012 | McGowan et al. |
| 2012/0072541 A1 | 3/2012 | Carls et al. |
| 2012/0072542 A1 | 3/2012 | McGowan |
| 2012/0124624 A1 | 5/2012 | Lau et al. |
| 2012/0185895 A1* | 7/2012 | Wong et al. .................... 725/32 |
| 2012/0197419 A1 | 8/2012 | Dhruv et al. |
| 2012/0198089 A1 | 8/2012 | Dhruv et al. |
| 2012/0198492 A1* | 8/2012 | Dhruv et al. .................... 725/32 |
| 2012/0254367 A1 | 10/2012 | McGowan |
| 2012/0259946 A1* | 10/2012 | Stockhammer et al. ...... 709/217 |
| 2013/0060911 A1* | 3/2013 | Nagaraj et al. ................ 709/219 |
| 2013/0091251 A1* | 4/2013 | Walker et al. ................. 709/219 |

OTHER PUBLICATIONS

Related PCT Application No. PCT/CA2013/000379 Written Opinion of the International Searching Authority dated Jul. 15, 2013.

Corresponding PCT International Application No. PCT/CA2013/000624 International Search Report dated Oct. 18, 2013.

Corresponding PCT International Application No. PCT/CA2013/000624 Written Opinion of the International Searching Authority dated Oct. 18, 2013.

Corresponding PCT International Application No. PCT/CA2013/000628 International Search Report dated Oct. 29, 2013.

Corresponding PCT International Application No. PCT/CA2013/000628 Written Opinion of the International Searching Authority dated Oct. 29, 2013.

* cited by examiner

Fig. 3

| p1 | p2 | p3 | a1 | a2 | a3 | a4 | a5 | a6 | a7 | a8 | a9 | p4 | p5 | ... |

| p1 | p2 | p3 | a1 | a2 | a3 | a4 | a5 | a6 | a7 | a8 | a9 | p4 | p5 | ... |

METHOD AND SYSTEM FOR DYNAMICALLY SELECTING, ASSEMBLING AND INSERTING CONTENT INTO STREAM MEDIA

RELATED APPLICATIONS

The present invention references technology and inventions described in co-pending US patent application, filed Jul. 30, 2012 and entitled "Method and System For Dynamically Inserting Content into Streaming Media", accorded Ser. No. 13/561,188 and pending PCT patent application, filed Jul. 9, 2013 and entitled, "Method and System For Dynamically Inserting Content Into Streaming Media", each of which are assigned to the assignee of the present invention. Priority is claimed to each of these earlier filed applications and the contents of these earlier filed applications are incorporated herein, in their entirety, by reference.

FIELD OF THE INVENTION

The present invention relates to a system and method for dynamically selecting, assembling and inserting content into streaming media. More particularly, the present invention relates to a system and method of selecting and assembling content for insertion into streaming media, where that content can be selected at, or near, the time of playback.

BACKGROUND OF THE INVENTION

The spread of the Internet and the general availability of data connections are changing the way media is provided and used. In particular, conventional television and/or radio (i.e.—audio) services are increasingly giving way to digital network-based streaming media on demand and/or live streaming media. Such streaming media content can be delivered through any digital network, such as a cable company's set top box-based network or a cellular data network, or increasingly, through the Internet. The delivery can be to any suitable rendering device, such as an Apple TV or an Xbox 360, connected to a television or monitor, or can be to a rendering device and display, such as an Internet TV or a mobile device, such as player software executing on an Apple iPad, a laptop computer, a mobile phone, etc.

In most cases, streaming media is delivered in "chunks" through the network to the rendering device. Each chunk will typically contain the video and/or audio information required to render a selected duration, such as ten seconds, of the media at a given resolution or playback quality. When a rendering device plays a program, it first downloads a manifest, such as a playlist or equivalent data, that defines the chunks making up the program. The manifest can include a list of URIs pointing to the chunks, or can include a variety of other methods for identifying the relevant chunks, such as a set of http requests for byte ranges within a file, or a URI template which allows for a URI to be constructed, in a defined manner, to retrieve the program (e.g.—http//content-.com/content/chunk{number}.ts, where {number} is a value that that is incremented to retrieve each subsequent chunk). The rendering device downloads the first one or more chunks of the program specified by the manifest into a player cache and begins playback of those chunks while one or more of the next needed chunks, as defined by the manifest, are being downloaded through the network. In this manner, playback of the program can start before the entire program has been downloaded. For a variety of reasons, the manifest cannot be amended or updated by the rendering device and any changes or updates must be provided to the rendering device from the network.

Live programs are broadcast in a similar manner but with a manifest that is dynamically updated from the network, having content added to the manifest as the live event transpires and the manifest may be updated during the streaming of the program to include URI's or other suitable identifiers of newly added content.

As the marketplace shifts towards delivery of content via such streaming media delivery systems, the ability to advertise in such streaming media has also offered new opportunities to advertisers and content deliverers. For example, it is desirable, when media is requested by a viewer, to select the advertisements to be shown and/or played during the delivery of the program (i.e.—targeted advertisements), the advertisements being selected based upon any suitable criteria, such as: viewer demographics, including where the rendering device/viewer is located and/or the particular viewer watching the content; the type of rendering device (mobile versus fixed) that the content is being played on; etc. In fact, a wide range of demographic and other criteria could be applied to the selection of which advertisements (or other content) will be shown to which viewers and the full range of such considerations is beyond the scope of the present invention.

However, the need to provide a predefined manifest, or equivalent, before beginning playback of a streaming program has limited the ability to dynamically insert content into streaming media to only the simplest cases. Specifically, the manifest must include a definition of each chunk of media to be rendered, including any advertising content to be included. Further, the suspension of the playback of one piece of content (e.g.—the main content) and start of playback of another piece of content (e.g.—advertising content) requires the manifest to include a discontinuity indicator (or equivalent).

Specifically, as the rendering device rendering the content employs various time indicators within the content to properly render the content, the rendering device must be notified when a different piece of content, and thus a different set of time indicators, is to be used.

In the HLS standard, discussed below, this notification to the rendering device is achieved through the use of a discontinuity indicator in the playlist, but other streaming standards have equivalent, or similar, requirements and features.

For example, assuming that an advertising break in a program includes three thirty-second ads, a discontinuity indicator, or equivalent, must be included in the manifest between the last part of the main program to be rendered prior to the advertising break and the first piece of advertising content (i.e.—the first thirty-second advertisement), another discontinuity indicator must be provided between the end of the first piece of advertising content and the start of the second piece of advertising content (i.e.—the second thirty-second advertisement), another discontinuity indicator must be provided between the end of the second piece of advertising content and the start of the third piece of advertising content (i.e.—the third thirty-second advertisement) and, finally, another discontinuity indicator must be provided between the end of the third piece of advertising content and the next piece of the main program to be played after the advertising break.

Thus, at the time of creation of the playlist, or other manifest, (prior to its transfer to a rendering device), the number of different pieces advertising content and the duration of each piece of that advertising content to be inserted into a requested program must be known and defined within the manifest.

As will be apparent, this need to define the manifest in such a manner requires the content for advertising breaks to be known at the time of creation of the manifest, or requires some sort of standardization of advertising breaks (i.e.—all ad breaks always comprise three thirty-second ads), and both such limitations are undesirable.

Accordingly, it is desired to have a system and method which enables the selection and insertion of content into streaming media without being subject to such limitations and, in particular, which enables the selection and insertion of content after the manifest has been provided to the rendering device.

SUMMARY OF THE INVENTION

It is an object of the present invention to provide a novel system and method for dynamically selecting, assembling and inserting content into streaming media which obviates or mitigates at least one disadvantage of the prior art.

According to a first aspect of the present invention, there is provided a method of dynamically selecting, assembling and inserting content into a streaming media program, comprising the steps of: (i) receiving a request for a streaming media program from a rendering device; (ii) providing a manifest to the rendering device, the manifest defining the requested streaming media program which comprises at least one main program and at least one duration between a breakpoint and a re-entry point within the at least one main program at which inserted content is to be inserted, the manifest including identifiers of the at least one main program and identifiers of the at least one duration for inserted content; (iii) receiving requests from the rendering device, based upon the identifiers of the at least one main program, for durations of the at least one main program content and providing the corresponding requested durations of the at least one main program content to the rendering device through a network; and (iv) receiving requests from the rendering device, based upon the identifiers of the at least one duration for inserted content and in response to at least a first received request for inserted content: (a) selecting at least one piece of inserted content whose total duration equals the at least one duration between the breakpoint and re-entry point within the at least one main program at which inserted content is to be provided; and (b) providing an assembled emulated single piece of content, comprising the at least one piece of inserted content, to the rendering device, in response to the requests for inserted content, through a network.

Preferably, the identifiers of the at least one main program are URIs, or equivalents, and the identifiers of the at least one duration for inserted content are meta URIs.

According to another aspect of the present invention, there is provided a system for dynamically selecting, assembling and inserting content into streaming media, comprising: a program management system operable to respond to a request from a rendering device to provide a manifest defining a streaming media program comprising at least one main program and at least one duration, between a breakpoint in the at least one main program and a re-entry point in the at least one main program, where inserted content is to be inserted, the manifest including identifiers to identify the at least one main program and identifiers to indentify the at least one duration; a content delivery network operable to provide the at least one main program to the rendering device in response to requests identifying the at least one main program with the corresponding identifiers in the manifest; and a dynamic content decisioning system operable, in response to requests identifying the at least one duration with the corresponding identifiers in the manifest, to select at least one piece of inserted content whose total duration equals the at least one duration and to provide an assembled emulated single piece of content comprising the selected at least one piece of inserted content and to provide that assembled emulated single piece of content.

The present invention teaches a method and system for dynamically selecting, assembling and inserting content into streaming media. The system and method allow for the selection of the content to be inserted into a streaming media program to be performed after the manifest, or equivalent, defining the streaming media program has been provided to a rendering device and to allow the selection of one or more pieces of content to fill a defined insertion point duration, provided only that the total duration of the selected pieces of content equal the duration of the defined insertion point. Selected pieces of content to be inserted are assembled by the system and method into an emulated single piece of content which removes the need for discontinuity indicators, or equivalents, to be placed in the manifest between the selected pieces of content. Thus, the selection of such inserted content can be much more flexible and dynamic, allowing for a more commercially viable delivery of the streaming media program to be achieved.

Other features and advantages of the present invention are described more fully below.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

As used herein, the term "streaming media", "streaming media program" and "streaming content" are intended to broadly encompass any media program including at least one of digital video and/or digital audio content which can be rendered and played by a rendering device at the receiving end of one or more wired or wireless data connections. Streaming media, streaming media programs or streaming content can be audio programs and/or music, video on demand programs, linear video programs, live video programs or interactive programs and can be transported through the data network in any suitable manner as will occur to those of skill in the art.

Further, while the following discussion refers, as an example, to the HLS protocol proposed by Apple in an IETF draft RFC, and to MPEG-2 transport streams being transmitted with that protocol via a TCP/IP network, the present invention is not so limited. Instead the present invention can be employed with a wide variety of streaming protocols and network protocols for delivering streaming media programs.

The latest draft RFC for the HLS protocol is entitled "HTTP Live Streaming: draft-pantos-http-live-streaming-11" and is dated Apr. 16, 2013 and the contents of this document are incorporated herein, in their entirety, by reference. The MPEG-DASH protocol, developed by the MPEG consortium, is another example of a streaming media protocol with which the present invention can be employed and other suitable protocols exist or may be developed in the future.

As used herein, the term "chunk" is intended to comprise any segment, fragment, byte range or other portion into which streaming media is arranged for transmission through an appropriate network by a content provider or other entity. As will be understood by those of skill in the art, after being formed, chunks may also subsequently be rearranged by the transport (or other) layer(s) of the respective network (i.e.— TCP/IP packet segmentation and reassembly) but as used herein a chunk is the portion of the streaming media data as provided to a network by the content provider or delivery system and which can render a predefined duration of the digital media.

In some embodiments, a URI indicating a chunk, an http request defining a byte range, a URI template, or any other suitable technique as would be apparent to those of skill in the art, is used as an identifier of a desired portion of a streaming program which is stored in one or more files on a storage system, such as a content delivery network.

In such a case, the content delivery network on which the streaming program is stored will have a chunk comprising an appropriate portion of the file, or files, corresponding to the requested portion of the program and that chunk will be streamed through one or more networks to the requesting device. Accordingly, as used herein, the term "chunk" is intended to comprise any suitable structure for transferring a defined portion of streaming media content to a rendering device.

As used herein, the term "manifest" is intended to broadly include playlists, as defined by the HLS protocol, media presentation descriptions (MPDs) as defined by the MPEG-DASH protocol or any other data structure or method for sufficiently describing the contents of a streaming media program, at one or more resolutions, for streaming through a network and playback at the edge of the network.

Also as used herein, the term URI is meant to broadly include any suitable method of identifying data available for access through a network, such as the URIs defined in the IETF RFC3986 "Uniform Resource Identifier (URI): Generic Syntax", an http request defining a byte range, or any other suitable mechanism, system or method for identifying such data.

Further still, as used herein the term "inserted content", "dynamic content" and/or "dynamically inserted content" is intended to comprise any media content, video and/or audio, which it is desired to insert into a streaming media program and which content is selected for insertion into the streaming media program when the rendering device rendering the streaming media program attempts to download a chunk, defined in the manifest it has received from the network, corresponding to at least part of the time duration of the streaming media program in which the inserted content is to be rendered.

While the most common example of inserted content may be advertising programming, it is also contemplated that other categories of content can be inserted, if desired, and such categories of inserted content can include: alternate endings to streaming media programs; substitution of program durations with other programs, or black screens, such as for sports "blackouts"; changes to scenes or portions of scenes within a streaming media program; implementations of TV-like "channel surfing" through available streaming media programs, live or on demand, where the inserted content is the streaming media program on the new channel the user switches to; etc.

Further, inserted content can be overlay content displayed upon, or played in combination with, the main program. Such overlay content can also be interactive content and the use of such content is described in published U.S. patent application 2011/0145858, assigned to the assignee of the present invention.

Further, as used herein the terms "rendering device" and/or "player" are intended to include any device or system for playing streaming media for a user. Rendering devices and players can include, without limitation, dedicated media playback devices, software players executing on hardware devices such a tablet players or smartphones, personal computers executing a suitable software player, games consoles such as a Microsoft Xbox 360 or Sony PS3 connected to a monitor or television, media rendering devices such as an Apple TV or WD TV Live, Smart TV's, etc.

As mentioned above, when a streaming program is requested by a user, a manifest, such as a playlist or equivalent, is provided to the rendering device of the user and the rendering device begins to download the chunks of content identified in the manifest and commences rendering the streaming media program. Typically, a manifest is a text file and, in the HLS protocol, a pseudo representation of a portion of the manifest may look something like:

P1.ts
P2.ts
P3.ts
Discontinuity D1
S1.ts
S2.ts
S3.ts
Discontinuity D2
R1.ts
R2.ts
Discontinuity D3
Q1.ts
Q2.ts
Q3.ts
Q4.ts
Discontinuity D4
P4.ts
P5.ts
. . .

where: P1.ts, P2.ts, P3.ts, P4.ts and P5.ts are URIs identifying corresponding chunks of a main program P; S1.ts, S2.ts and S3.ts are URIs identifying corresponding chunks of a first piece of inserted content S; R1.ts and R2.ts are URIs identifying corresponding chunks of a second piece of inserted content R; and Q1.ts, Q2.ts, Q3.ts and Q4.ts are URIs representing a third piece of inserted content Q, where S, R and Q are three different pieces of inserted content which are to be inserted into the playback of main program P. The end of chunk P3.ts comprises a main program break point and the beginning of chunk P4.ts comprises a main program re-entry point, the duration between the breakpoint and the re-entry point representing the total duration of the inserted content.

Figure 1:
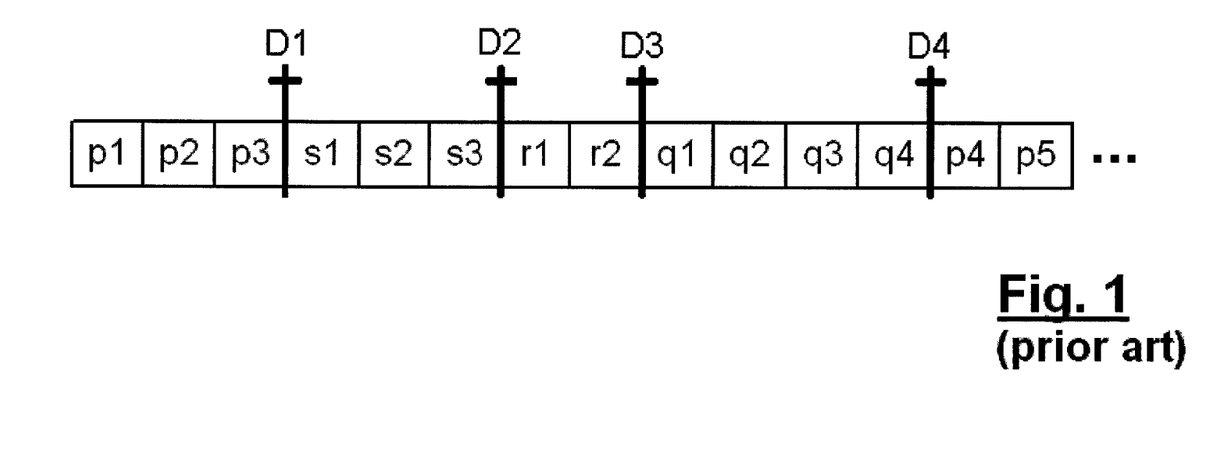
FIG. 1 shows a schematic representation of a prior art streaming media program with inserted content.

FIG. 1 shows a schematic representation of the streaming media program which corresponds to this sample manifest. As is shown, assuming that each chunk defines ten seconds of content, inserted content S has three chunks (s1 to s3) and thus has a total duration of thirty seconds, inserted content R has two chunks (r1 and r2) and thus has a total duration of twenty seconds and inserted content Q has four chunks (q1 to q4) and thus has a total duration of forty seconds.

As is also shown, in both the sample manifest set out above and in FIG. 1, each transition between different pieces of content, i.e. from the breakpoint in main streaming media program P to inserted content S, from inserted content S to inserted content R, from inserted content R to inserted content Q and from inserted content Q back to the re-entry point of main streaming media program P is separated by a discontinuity (D1 through D4), indicated by the vertical lines in the Figure and by the Discontinuity indicators (discussed below) in the simplified sample manifest above.

In this example of the prior art, it must be decided at the time of creation of the manifest that the total duration of the inserted content for streaming media program P between chunk p3 (the breakpoint) and chunk p4 (the re-entry point) will be, in this example, ninety seconds and specifically that that duration will be split into a thirty second duration into which content S will be inserted, followed by a twenty second duration into which content R will be inserted, followed in turn by a forty second duration into which content Q will be inserted.

Once the manifest is defined, it is not possible to change the selected pieces of content to be inserted, nor the respective durations of the individual pieces of inserted content. In fact, it is not possible to change any piece of the content to be inserted (i.e.—no substitution of a different piece of a twenty second piece of content for content R) nor even to change the order of the rendering of the three defined pieces of content (i.e. it is not possible to insert content Q before S and R).

The first limitation results from the fact that the URIs in the manifest identify specific pieces of content (i.e. S, R, Q, etc.). This limitation has now been addressed by the inventions described in co-pending U.S. patent application Ser. No. 13/561,188, discussed above. By replacing URIs with meta URIs, the manifest can be defined with meta URIs that are only associated with specific inserted content when the rendering device attempts to download inserted content via the meta URIs, as described below.

While the invention and use of meta URIs has been a significant enhancement to streaming media systems, the limitation that different pieces of content must be separated in the manifest by discontinuity indicators still exists. Thus, the specific durations of individual pieces of content that will be inserted into the streaming media program must be defined when the manifest is defined and this is an undesired limitation as it significantly limits the ability to dynamically decision the content to be inserted into the main program.

Discontinuity indicators are required by the rendering device because the rendering device expects that timing information and stream header information (such as PID references and tables in MPEG transport streams), will be consistent between pieces of content and from chunk to chunk of that content. The player or rendering device requires the timing information in the streaming media program and the stream header information to be consistent or the rendering device must be notified, via a discontinuity indicator or equivalent, that a discontinuity will occur in the timing information and in the stream header information.

In the prior art example of FIG. 1, the relevant timing information and stream header information (collectively referred to herein as "sequencing information") in chunk s1 have values which are likely not consistent with the sequencing information in preceding chunk p3. Similarly, the relevant sequencing information in chunk r1 have values which are almost certainly not consistent (i.e.—are inconsistent) with the values of the sequencing information in chunk s3, the relevant sequencing information in chunk q1 is almost certainly not consistent with the values of the sequencing information in chunk r2, and the relevant sequencing information in main program chunk p4 is almost certainly inconsistent with the values of the sequencing information in chunk q4.

In fact, in at least the HLS protocol, it is normal practice to start the timing values in each streaming media program or discrete piece of inserted content at a nominal value, such as zero, or ten, and to count upwards from there. Thus, typically the sequencing information in inserted content S would start at a low value, such as ten, as would the sequencing information in inserted content R and the sequencing information in inserted content Q. At the same time, the sequencing information in chunk p4 (which values would follow from those in chunk p3) would likely have values higher than those in chunk q4.

Thus, in the prior art, to enable a rendering device to properly render a streaming media program with inserted content, discontinuity indicators must be included between each piece of discrete content as these pieces of discrete content will have inconsistent sequencing information.

While inserting content into streaming media programs via the prior art technology using discontinuity indicators, described with reference to FIG. 1, does work, it severely limits the ability of a content provider, or other entity, to dynamically select and insert content into a program as each piece of inserted content must fit between a pair of discontinuity indicators that have been defined at the time of definition of the manifest. Thus a decision must be made at the time of creation of the manifest as to how many pieces of content are to be inserted, and the order and duration of each of those pieces of inserted content.

In contrast, in an embodiment of the present invention, further described below, one or more pieces of inserted content can be inserted at each preselected location, defined in a manifest or equivalent, provided only that the total duration of all of the selected pieces of inserted content for that preselected location match the duration between a breakpoint and re-entry point defined in the manifest for that preselected location. In other words, with the present invention a preselected location with a defined duration of, for example, ninety seconds can have a single ninety second piece of inserted content, or three thirty-second pieces of inserted content, or two forty-five second pieces of inserted content or any other combination of pieces of inserted content whose total duration matches the duration defined in the manifest for the preselected location.

Figure 2:
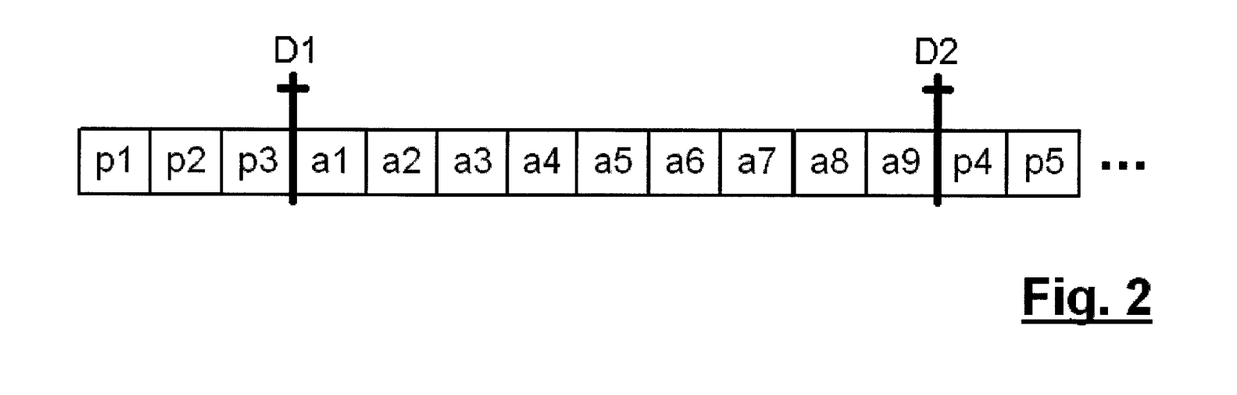
FIG. 2 shows a schematic representation of a streaming media program with inserted content in accordance with an embodiment of the present invention.

FIG. 2 shows a schematic representation of a streaming media program constructed in accordance with a first embodiment of the invention. As can be seen, the streaming media program contains only two discontinuities, a first discontinuity D1 between chunk p3 of main Program P (the breakpoint) and the first chunk, in this example a1, of assembled inserted content A, and a second discontinuity D2 between the last chunk of assembled inserted content A, in this example a9, and the next chunk p4 (the re-entry point) of the main program P.

A pseudo representation of a portion of the manifest for the streaming media program of FIG. 2 may look something like:
P1.ts
P2.ts
P3.ts
Discontinuity D1
A1.ts
A2.ts
A3.ts
A4.ts A5.ts
A6.ts
A7.ts
A8.ts
A9.ts
Discontinuity D2
P4.ts
P5.ts
. . .

In this example, A1.ts through A9.ts are meta URIs, as described in the above-referenced co-pending U.S. application Ser. No. 13/561,188, and are resolved by the content delivery network to indicate specific chunks of content when the rendering device requests the download of those chunks. However, as further described below, by further processing the inserted content when it is selected for association with the meta URIs, the need for discontinuity indicators between adjacent durations of inserted content can be eliminated.

Figure 3:
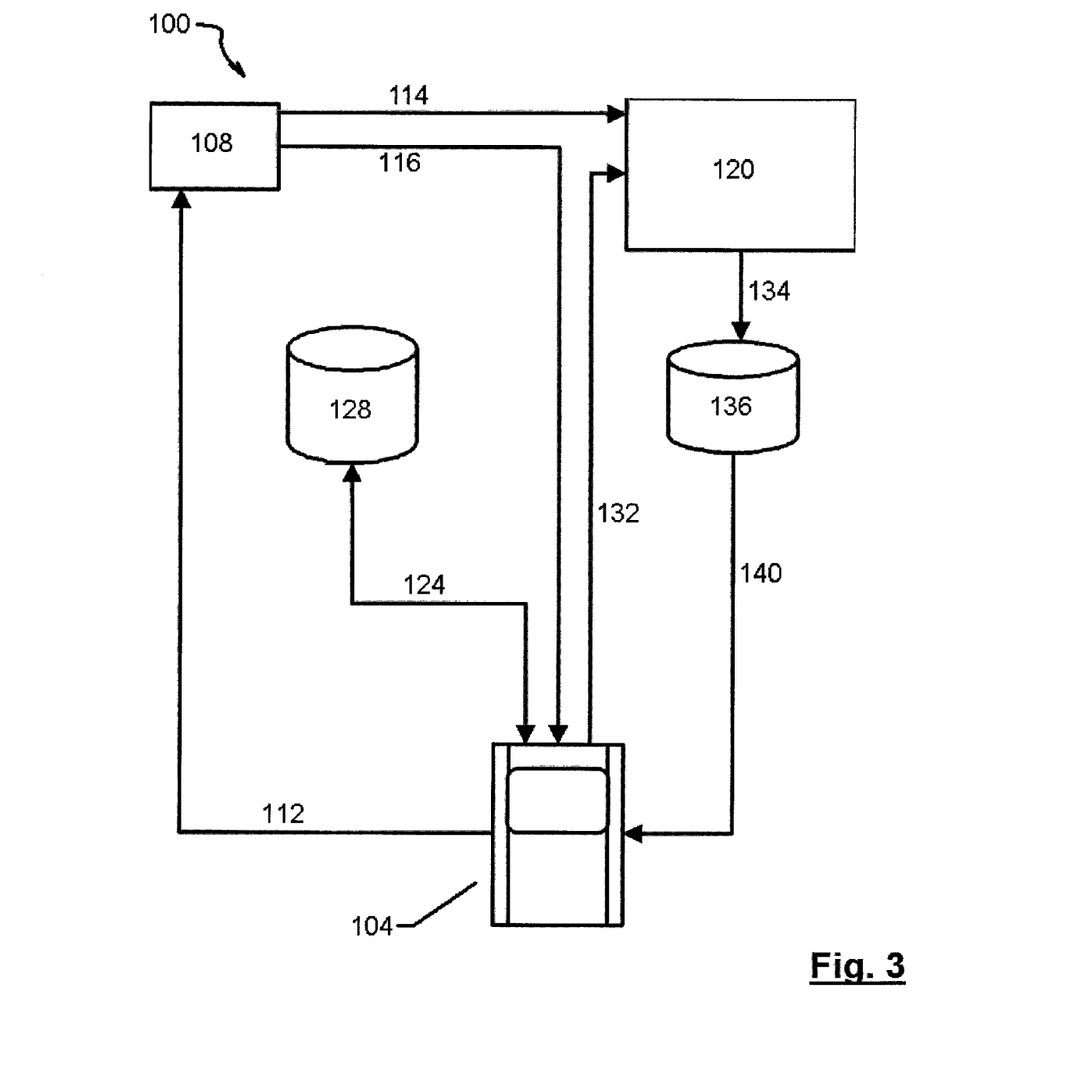
FIG. 3 shows a schematic representation of a streaming media system in accordance with the present invention.

FIG. 3 shows a streaming media system 100, in accordance an embodiment of the present invention, and a rendering device 104 for playback of streaming media. As mentioned above, rendering device 104 can be a dedicated playback device, such as a purpose built digital media player, or can be an appropriate software player executing on hardware such as a computing tablet (e.g.—as an Apple iPad) or the like, a gaming device (e.g.—a Microsoft Xbox360) or the like, a media player, such as an Apple TV, connected to an appropriate television or other display, etc.

While not explicitly indicated in FIG. 3, the interconnection of components of system 100 and the connections to rendering device 104 are accomplished via one or more data networks. As will be apparent, these data networks can be proprietary/private, such as cable companies' set-top box networks, and/or public networks, such as the Internet. It is contemplated that, in many circumstances, a combination of proprietary and public networks will be employed in system 100. Further, these data networks can be wired, or wireless, permitting delivery of streaming content to rendering devices 104 at fixed locations and/or to rendering devices 104 which are mobile and/or nomadic.

System 100 includes a program management system 108 which contains metadata and other information about streaming media programs available from system 100. Program management system 108, which can comprise a content information system, content management system or any other suitable system for accepting requests for streaming media programs, either includes, or has access to, pre-created manifests for the available content, or is capable of creating such manifests, or having them created, as needed.

When a user of rendering device 104 wishes to play a streaming media program available from system 100, rendering device 104 sends a request 112 for the desired program to program management system 108. The format of request 112 is not particularly limited and any method of requesting an available program can be employed. It is contemplated that, in some embodiments, request 112 can include additional explicit and/or implicit information, such as demographic information indicating specifics about rendering device 104 (type of device, location of the device, etc.) and/or about the user of rendering device 104 (the location of the user from an IP address, or GPS data provided by the rendering device, the network the user is connecting through, user demographic information etc. from the user's account set up information or the like) when such information is available. In other embodiments, this additional information can be provided, via a cookie, from the user's rendering device or via any other suitable method as will be apparent to those of skill in the art.

Such additional information can be used by system 100 in a variety of manners, including as an input 114 to a dynamic content decisioning system 120, as described further below.

Upon receiving a valid request 112, program management system 108 provides rendering device 104 with a manifest 116, or a reference to manifest 116, for the requested streaming program. It is contemplated that manifest 116 will have been previously created for the requested program in the case of a video on demand program, but it is also contemplated that manifest 116 can be created in response to receiving request 112, can be mapped to an existing live manifest or can be a dynamically created manifest for a live streaming media program.

In the illustrated embodiment of the present invention, manifest 116 includes URI's or other identifiers which identify the chunks of the requested streaming media program and also includes meta URIs which indicate content which is to be inserted into the streaming media program. As discussed above, a meta URI does not indicate any specific content when the manifest, or equivalent, is defined, but each meta URI will be associated with a specific chunk of inserted content when a rendering device 104 attempts to download a chunk of content using the meta URI.

Program management system 108 can also pass relevant information 114 about the playback session (such as any user demographic information) to dynamic content decisioning system 120.

In a first embodiment of the present invention, manifest 116 will have been created with predefined time points at which content is to be dynamically inserted into the streaming media program, as well as the total duration for the content to be inserted at each of those predefined time points. These insertion time points and durations are defined by inserting into the manifest the necessary number of meta URIs to define the desired duration of the dynamically inserted content and surrounding each set of meta URIs between a pair of discontinuity indicators, as discussed above and shown in FIG. 2.

Manifest 116 can then be provided to a rendering device 104 which can then begin playback of the requested program. Specifically, rendering device 104 will communicate (124) with a content delivery network 128, using the URIs (or equivalents) in manifest 116 to request and download appropriate chunks of the requested program and playback of the streaming media program can proceed in a substantially conventional manner.

When rendering device 104 encounters a meta URI in manifest 116, that meta URI directs rendering device 104 to request 132 content indicated by the meta URI from dynamic content decisioning system 120, or an equivalent source of content. In FIG. 3, dynamic content decisioning system 120 is shown as being separate from content delivery network 128. However, as will be apparent to those of skill in the art, dynamic content decisioning system 120 can be part of content delivery network 128, if desired, and in such a case dynamic content decisioning system 120 can be implemented as part of content delivery network 128, or as a separate server within content delivery network 128.

Request 132 includes information relevant to making a decision on selecting specific content to be inserted. This information can include information identifying the streaming media program being rendered on rendering device 104, the total duration of the break in the program available for insertion of content and additional information relating to user demographics, rendering device type, etc., which additional information can also be employed by dynamic content decisioning system 120. Because URIs or equivalents (and meta URIs) represent a pre-selected fixed duration of content, a duration in a streaming media program for dynamic content will typically comprise several meta URIs.

In the examples discussed above, chunks of the streaming media program render ten second durations of content, thus a ninety second total duration for dynamically inserted content would require nine meta URIs, each representing a duration of ten seconds of rendered content.

In this case, at least the first meta URI for each preselected insertion point in the streaming media program would preferably include information indicating to decisioning server 120, or equivalent source of content, the total length (duration) of the insertion point in the streaming media program (ninety seconds, in this specific example).

Alternately, such information can be supplied to dynamic content decisioning system 120, or equivalent source of content, from program management system 108 or other source when manifest 116 is provided to rendering device 104 or by any other suitable method as may occur to those of skill in the art.

Dynamic content decisioning system 120, or equivalent source of content, comprises a decisioning device, such as an advertisement decisioning service or other suitable system, and is responsive to request 132 to select one or more pieces of streaming media content for insertion into the duration of the predefined insertion point in the streaming media program. Advertisement decisioning and other content decisioning is a well-known field and suitable decisioning methods and systems will be apparent to those of skill in the art and the actual decisioning system employed with the present invention is not particularly limited.

In response to request 132, dynamic content decisioning system 120 selects one or more pieces of streaming media content, whose total duration equals the available duration defined in the manifest for the inserted content.

When selecting content to be returned to rendering device 104 in response to a meta URI, dynamic content decisioning system 120 will respond to the provided information (user demographics, etc.) and, in addition, will only select inserted content which is structurally compatible with the main program. Non limiting examples of possibly relevant structural parameters can include the codecs employed (audio and video), profile and GOP structure (size and length) of the main program, etc. The selection of structurally compatible content is presently necessary only because the decoder in rendering device 104 typically requires the content to be rendered to have substantially consistent structural parameters in order to avoid a noticeable decoder error. The various methods and/or systems for providing such compatible content will be apparent to those of skill in the art and are not discussed further herein. However, should a decoder in a rendering device not require content to be structurally compatible, this limitation on dynamic content decisioning system 120 may be removed.

Returning again to the example of FIG. 2, a ninety second total duration has been defined for the inserted content at the illustrated insertion point and dynamic content decisioning system 120 can select a single ninety second piece of compatible content, or any other combination of pieces of compatible content whose total duration equals ninety seconds. In the following discussion it is assumed that dynamic content decisioning system 120 has selected the three pieces of content shown in FIG. 1, specifically a thirty second piece of content, a twenty second piece of content and a forty second piece of content (respectively content S, R, and Q of FIG. 1).

As the inserted content duration is, in this embodiment, defined between a single pair of discontinuity indicators (D1 and D2), dynamic content decisioning system 120 acts as a processing element which assembles the selected three pieces of content to correspond to a single piece of inserted content having a total duration equal to the duration for the inserted content defined in the manifest for this insertion point. When properly assembled, as described below, the assembled content eliminates the need for discontinuity indicators between content S and R and between content R and Q.

Assembly of content S, R and Q commences by first arranging the selected three pieces of content in the desired order (S then R then Q) and continues by dynamic content decisioning system 120, or another processing element in system 100, then processing the content to be inserted by rewriting the sequencing information in each chunk of each piece of content S, R and Q such that the three pieces of content have consistent sequencing information between them (both timestamps and streaming header information), emulating a single piece of content "A" such that, to rendering device 104, will therefore appear as a single piece of content.

As used herein, the term "consistent" means that a rendering device can render the selected two or more pieces of content without requiring discontinuity indicators, or any other mechanism, to be placed between the content and the term "inconsistent" means that a discontinuity indicator, or other mechanism, must be provided between the pieces of content.

While the above-mentioned HLS protocol includes a specifically defined discontinuity indicator, other protocols and/or systems include similar or equivalent mechanisms which allow a decoder to be notified of content which is not consistent with prior content and such mechanisms are referred to collectively herein as discontinuity indicators or discontinuities. As will also be apparent, while in the examples above the discontinuity indicator is provided in the manifest, the present invention is not so limited and a discontinuity indicator can instead be embedded in a content chunk or can be provided to a decoder via any other suitable means including via a separate communication channel to the decoder.

In the specific case of MPEG transport streams (as used in the HLS and MPEG-DASH protocols and others) sequencing information includes a program clock reference (PCR) and at least one of a presentation time stamp (PTS) and a decoder time stamp (DTS) clock and one or more packet ID (PID) tables per chunk. To assemble the different pieces of dynamic content to emulate a single piece of content such that the assembled pieces are consistent, decisioning server 120 examines each chunk of the pieces of selected content and rewrites the PCR and the PTS and DTS clock data (if present) and the PID tables in those chunks to assemble the three pieces of content into a single piece of content "A" with consistent sequencing information which can be played at rendering device 104 without requiring discontinuity indicators between the pieces of content. This assembled emulated single piece of content "A" is shown as chunks a1 through a9 in FIG. 2.

The assembly of separate pieces of compatible content does not require re-encoding of the content, which is computationally expensive and could be difficult, or expensive, to achieve in real time. Instead, the assembly of compatible content merely requires the rewriting of the appropriate sequencing information in the chunks and thus is more easily performed in real time, i.e.—just before delivery of the content to rendering device 104.

It is also contemplated that, if desired, the rewriting of the sequencing information can be performed "on the fly", during the delivery of chunks of the assembled content. For example, the sequencing information in chunk a6 can be processed and rewritten while rendering device 104 is downloading chunk a5, etc.

While the discussion above indicates that dynamic content decisioning system 120 serves as a processing element which performs the assembly of individual pieces of content to be inserted to obtain an assembled emulated single piece of content with consistent sequencing information, it will be apparent to those of skill in the art that the present invention is not so limited and the assembly of content, selected by dynamic decisioning server 120, can be performed by any other suitable processing element, including one or more dedicated assembly servers, not shown. As the processing required to rewrite the sequencing information of the relevant chunks of inserted content to be consistent is similar to a subset of the processing performed when the content is first chunked, the necessary steps will be apparent to those of skill in the art and will not be further discussed in detail herein.

Once dynamic content decisioning system 120 has selected and the assembly of the selected content into an assembled emulated single piece of content has been performed (or has at least begun, in the case of on the fly assembly), dynamic content decisioning system 120 provides (134) the assembled content (chunks a1 through a9) to a dynamic content delivery server 136, or other suitable source for delivery to rendering device 104 in response to the relevant meta URI requests from rendering device 104.

Specifically, dynamic content delivery network 136 will provide (140) the first chunk a1 of the assembled emulated single piece of content, now corresponding to the first meta URI, to rendering device 104. As rendering device 104 processes each remaining meta URI in the set of meta URIs for this insertion location in the manifest by requesting (132) content from dynamic content decisioning system 120, those requests are served by dynamic content delivery network 136 delivering (140) each subsequent chunk of assembled emulated single piece of content "A" to rendering device 104.

Each subsequent insertion location, as defined by the manifest for the streaming media program, which employs meta URIs to define the location and duration of the inserted content, is handled in a similar manner. Thus, if a manifest defines five insertion locations within a streaming media program, dynamic content decisioning system 120 will, as needed, assemble five sets of inserted content, each assembled set of content being a respective assembled emulated single piece of content and those assembled emulated single pieces of content will be provided to a rendering device 104, as requested.

In some cases, the total duration of the decisioned content to be inserted at a defined location may be less than the duration defined for that location. In such cases, a duration of a default piece of content, typically referred to as a background "slate", equal to the missing duration can be added to the decisioned content by dynamic content decisioning system 120 such that the assembled emulated single piece of content will have its duration equal the duration defined for that insertion point. The use of such "slates" is well known in conventional broadcast systems to fill in periods of "empty air" and the present invention allows for the continued use of this technique in streaming systems.

While the example above describes cases wherein the selection and assembly of the assembled emulated single piece of content both occur dynamically in response to a request to dynamic content decisioning system 120 for content based upon a meta URI, it is also contemplated that in some circumstances one or more assembled emulated single pieces of content can be created before they are required and can be appropriately cached or stored. In such a case, the present invention can select between the instances of such cached or stored assembled emulated single pieces of content and/or other pieces of content. For example, it may be known that, depending upon a time of day or location, that a particular set of advertisements will commonly be provided during a program. In such a case, that particular set of advertisements can be pre-assembled into an assembled emulated single piece of content and cached. In this example, the cached assembled emulated single piece of content may be provided in response to most meta URI-based requests for content, but in some particular cases (e.g.—premium customers, etc.) dynamic content decisioning system 120 can instead select other pieces of content and assemble those into a different assembled emulated single piece of content which can be provided to the appropriate users in those particular cases.

As should now be apparent, this embodiment of the present invention provides a much-improved ability, with respect to the prior art, to decision and deliver dynamically inserted content into streaming media programs. With this embodiment, a manifest need only have defined the location of the insertion points at which content is to be inserted and the total duration of that insertion and the manifest need not define the specific inserted content, nor its structure (number of individual pieces of inserted content or their individual durations) of the content to be inserted therein. The manifest is merely defined with a set of meta URIs in the insertion location and a pair of discontinuity indicators surrounding the meta URIs.

Figure 4:
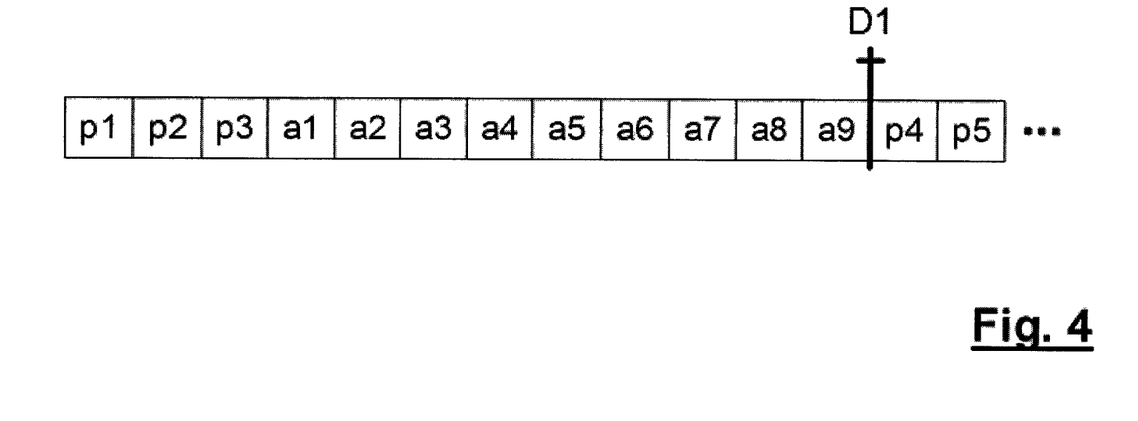
FIG. 4 shows a schematic representation of another streaming media program with inserted content in accordance with another embodiment of the present invention.

FIG. 4 shows a schematic representation of a streaming media program in accordance with another embodiment of the present invention. A pseudo representation of a portion of the manifest for the streaming media program of FIG. 4 may look something like:

P1.ts
P2.ts
P3.ts
A1.ts
A2.ts
A3.ts
A4.ts
A5.ts
A6.ts
A7.ts
A8.ts
A9.ts
Discontinuity D1
P4.ts
P5.ts
. . .

As shown, a main program P has an insertion location for dynamic content between chunks p3 (the breakpoint) and p4 (the re-entry point) of the main program and that insertion location is defined by meta URIs a1 through a9 and by a single discontinuity indicator D1, located after the last chunk of inserted content a9 before the re-entry point for main program P at chunk p4.

As before, when a rendering device 104 requests the next chunk of the streaming media program, where that next chunk is a meta URI for a dynamic content insertion point (in this example the first meta URI chunk a1), dynamic content decisioning system 120 receives the request and decisions the content to be rendered for the dynamic content insertion location.

Dynamic content decisioning system 120 (or other suitable processing element) then assembles the decisioned insertion content, which can comprise any number of different selected pieces of content (i.e.—S, R, Q, etc.), provided only that the total duration of that selected pieces of content equal the duration defined by the meta URIs in manifest 116, to form assembled emulated single piece of content A. However, in this embodiment, instead of rewriting the sequencing information of the assembled emulated single piece of content A starting at an arbitrary time point, the sequencing information of the assembled emulated single piece of content A are rewritten with the time sequencing information in the first chunk (i.e. a1), and subsequent chunks (a2 through a9), of the assembled emulated single piece of content being consistent with the sequencing information in the breakpoint of main program P (in this example p3) before the first meta URI.

Thus to rendering device 104, chunk a1 of the assembled emulated single piece of content is consistent with chunk p3 of the main program and can be rendered after chunk p3 with no discontinuity in the relevant sequencing information and thus no discontinuity indicator is required between p3 and a1.

After the last chunk of the assembled emulated single piece of content has been rendered (a9 in this example) the discontinuity indicator D1 is provided (as in the prior art) to allow rendering device 104 to continue with rendering the next chunk of the main program P at the main program re-entry point, in this example p4, as the sequencing information of chunk p4 would not be consistent with the sequencing information of chunk a9 of the assembled emulated single piece of content A.

While this embodiment requires a small amount of additional computation at dynamic content decisioning system 120, or other suitable processing element, to determine the appropriate initial clock values to use to assemble assembled emulated single piece of content "A", it does provide some significant advantages.

For example, one of the concerns that content delivery networks and advertisers have is that technology could be developed by hackers or others that will intercept manifest 116 on its way to rendering device 104, or elsewhere, to remove inserted advertising content from manifest 116. In particular, it is contemplated that such removal could be performed by removing from manifest 116 the URI's pointing to all chunks between adjacent discontinuity indicators, as such are presently required to be provided before and after each piece of inserted content.

With this embodiment of the present invention, such unauthorized editing or mutilation of manifest 116 is inhibited as only a single discontinuity is required at the end of the duration of inserted content and, as a meta URI will be indistinguishable (to a user or hacker) from a URI, hackers or others will not be able to determine the number of chunks preceding the discontinuity indicator which are dynamically inserted content and which are main program. Provided that different durations of dynamically inserted content are used, perhaps randomly, throughout the manifest for a streaming media program (i.e.—inserted content durations of thirty, sixty, ninety and/or one-hundred twenty seconds), then it will not be possible for a hacker or the like to know, or to make reliable assumptions, about which chunks of manifest 116 define dynamic inserted content.

As an alternative to this embodiment, the discontinuity indicator can instead be provided at the beginning of the inserted content location, in which case dynamic content decisioning system 120, or other suitable processing element, will assemble the assembled emulated single piece of content A to be inserted, rewriting the sequencing information of the assembled emulated single piece of content A starting at a determined value, such that the sequencing information in the last chunk (a9 in the example of FIG. 4) of assembled content A are consistent with the sequencing information in the first chunk of the re-entry point in main program P (p4 in the example of FIG. 4). Thus to a rendering device 104, chunk p4 of the main program can be rendered after chunk a9 of the assembled emulated single piece of content with no discontinuity in the relevant sequencing information.

Figure 5:
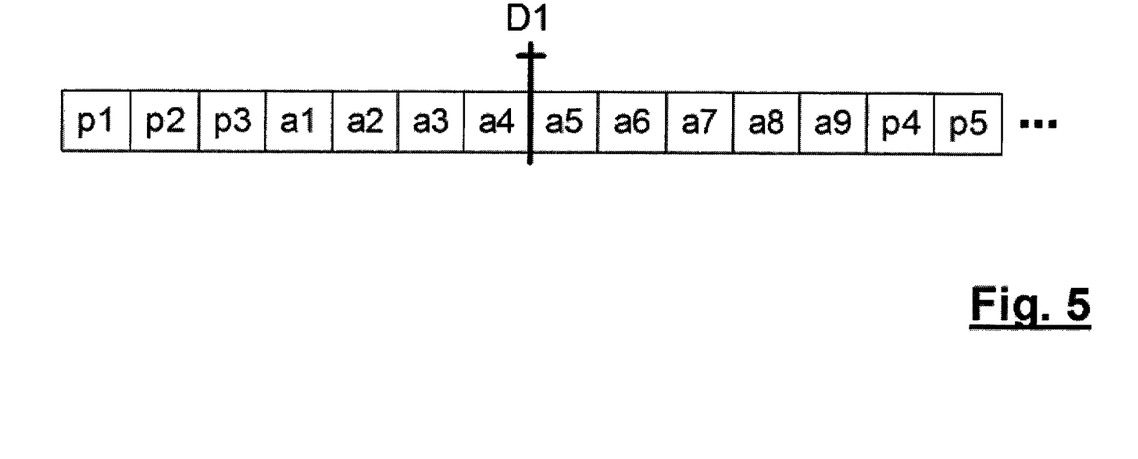
FIG. 5 shows a schematic representation of another streaming media program with inserted content in accordance with another embodiment of the present invention.

FIG. 5 shows yet another embodiment of the present invention, similar to those discussed above with respect to FIG. 4, wherein only a single discontinuity indicator need be included in manifest 116 for a duration of inserted content. However, as shown in FIG. 5, in this embodiment, discontinuity indicator D1 need not be located at the beginning, or end, of the duration of the inserted content. Instead, discontinuity indicator D1 can be located anywhere within the total duration of the assembled emulated single piece of content "A".

A pseudo representation of a portion of the manifest for the streaming media program of FIG. 5 may look something like:

P1.ts
P2.ts
P3.ts
A1.ts
A2.ts
A3.ts
A4.ts
Discontinuity D1
A5.ts
A6.ts
A7.ts
A8.ts
A9.ts
P4.ts
P5.ts
. . .

As before, in this embodiment dynamic content decisioning system 120, or other suitable processing element, will assemble the selected pieces of inserted content and rewrite the sequencing information of the chunks of the assembled emulated single piece of content "A" such that the chunks before the discontinuity indicator D1 (in this example chunks a1, a2, a3 and a4) consistently follow from the sequencing information in the breakpoint of main program P (in this example p3) before the inserted content. Dynamic content decisioning system 120 also rewrites the sequencing information for the chunks of assembled inserted content after the discontinuity indicator D1 (in this example chunks a5, a6, a7, a8 and a9) such that the sequencing information of the last chunk (e.g.—a9) will have values consistent with the sequencing information in the re-entry point of the main program (in this example p4). Thus, the sequencing information in assembled emulated single piece of content "A" have a discontinuity D1 between chunks a4 and a5 within their total duration but, prior to and after that discontinuity, are consistent with the sequencing information in the preceding and following chunks of main program P.

It is contemplated that the embodiment described above with respect to FIG. 5 will further complicate attempts to remove inserted content from manifest 116 and will avoid the desire to have different durations for inserted content as it is only necessary to vary the location of the discontinuity D1 within the assembled inserted content duration to confuse those seeking to remove inserted content from the playback of the streaming media program.

The embodiments of the present invention described above, which only require a single discontinuity indicator, are also useful even in cases where only a single piece of content is to inserted into a location in the streaming media program. In such cases, the processing of that single piece of inserted content to rewrite its sequencing information to only require a single discontinuity indicator can prevent hackers or others from being able to remove or otherwise prevent playback of the inserted content. In such a case, the assembled emulated single piece of content will be, in fact, a single piece of content whose sequencing information has been rewritten as necessary.

In yet another embodiment of the present invention, inserted content can be inserted without requiring any discontinuity indicators to be provided. In this embodiment, dynamic content decisioning system 120, or other suitable processing element, will first operate as described above with respect to the example of FIG. 4. Specifically, dynamic content decisioning system 120 will assemble emulated single piece of content "A" with the sequencing information of that assembled emulated single piece of content being rewritten to be consistent with the sequencing information of the main program before the breakpoint location (in the example of FIG. 4, the sequencing information of a1 and subsequent chunks of the assembled emulated single piece of content are rewritten to be consistent with the sequencing information of chunk p3).

However, in this embodiment, dynamic content decisioning system 120, or other suitable processing element or the like, will also rewrite the sequencing information of all subsequent chunks of the streaming media program P, as requested by a rendering device 104, on the fly such that the sequencing information of those chunks are consistent with the sequencing information in the last chunk of assembled emulated single piece of content A. Thus, dynamic content decisioning system 120 will, as needed, rewrite the sequencing information of the subsequent chunks (p4 and onwards) of the main program P of the streaming media program.

While this may seem an onerous solution, as mentioned above, no re-encoding or re-chunking is required to rewrite the sequencing information of chunks and thus the computational requirements to perform the "on the fly" rewriting of the sequencing information are not high. Further, in some content delivery systems (such as those wherein the chunks are formed on the fly from an intermediate representation) the chunks must already be computationally processed before delivery to a rendering device 104 and thus the added requirement to rewrite their sequencing information can be easily accomplished.

As will now be apparent, the present invention provides a novel and advantageous method and system for assembling and inserting content into a streaming media program. Unlike the prior art, with the present invention the selection of content to be dynamically inserted into a streaming media program can be selected after the manifest has been provided to a rendering device. Further, the durations of different pieces of content to be inserted into a defined location of a streaming media program need not be defined when the manifest is defined.

Thus, the selection of such inserted content can be much more flexible and can be performed dynamically, allowing for a more commercially viable delivery of the streaming media program to be achieved. In one embodiment, at least one piece of inserted content can be assembled to obtain an assembled emulated single piece of content which can be rendered by a rendering device without requiring discontinuity indicators, or equivalents, to be provided between the pieces of inserted content.

In other embodiments, the assembly of at least one piece of inserted content is performed such that the assembled emulated single piece of content is consistent with either the main program content before the assembled emulated single piece of content, or the main program content after the assembled emulated single piece of content and only a single discontinuity indicator, or equivalent, must be provided between the main program and the inconsistent part of the assembled emulated single piece of content.

In yet another embodiment, the assembly of the at least one piece of inserted content is performed such that the assembled emulated single piece of content is consistent with the main program prior to the assembled content and the main program after the assembled content is processed, as it is provided to the rendering device, to make it consistent with the end of the assembled content.

The present invention teaches a method and system for dynamically selecting and inserting content into streaming media which allows for at least one piece of inserted content to be assembled and inserted into a streaming media program, the selection of the inserted content being performed after the definition of the manifest, or equivalent, for the streaming media program.

The above-described embodiments of the invention are intended to be examples of the present invention and alterations and modifications may be effected thereto, by those of skill in the art, without departing from the scope of the invention which is defined solely by the claims appended hereto.

We claim:

1. A method of dynamically selecting, assembling and inserting content into a streaming media program, comprising the steps of:
   (i) receiving a request for a streaming media program from a rendering device;
   (ii) providing a manifest to the rendering device, the manifest defining the requested streaming media program which comprises at least one main program and at least one duration between a breakpoint and a re-entry point within the at least one main program at which inserted content is to be inserted, the manifest including identifiers of the at least one main program and identifiers of the at least one duration for inserted content;
   (iii) receiving requests from the rendering device, based upon the identifiers of the at least one main program, for durations of the at least one main program content and providing the corresponding requested durations of the at least one main program content to the rendering device through a network; and
   (iv) receiving requests from the rendering device, based upon the identifiers of the at least one duration for inserted content and in response to at least a first received request for inserted content: (a) selecting at least two pieces of inserted content, said at least two pieces of inserted content having a total duration which equals the at least one duration between the breakpoint and re-entry point within the at least one main program at which inserted content is to be provided; and (b) providing an assembled emulated single piece of content, comprising the at least two pieces of inserted content processed to have consistent sequencing information between a discontinuity indicator in the manifest and one of the breakpoint and the re-entry point of the at least one main program, to the rendering device, in response to the requests for inserted content, through a network.

2. The method of claim 1 wherein the identifiers of the at least one main program are URIs and the identifiers of the at least one duration for inserted content are meta URIs.

3. The method of claim 2 wherein the URIs are constructed at the rendering device from a URI template provided in the manifest.

4. The method of claim 1 wherein the assembled emulated single piece of content is assembled after the selection of the at least two pieces of inserted content.

5. The method of claim 1 wherein a first discontinuity indicator is provided in the manifest between the at least one main program breakpoint and the start of the at least one duration and a second discontinuity indicator is provided between the end of the at least one duration and the assembled emulated single piece of content is processed to have consistent sequencing information between the first discontinuity indicator and the second discontinuity indicator.

6. The method of claim 1 wherein, the assembly of the selected at least two pieces of inserted content into an assembled emulated single piece of content is performed such that no discontinuity occurs between the break point of the at least one main program and the start of the assembled emulated single piece of inserted content and wherein the discontinuity indicator is provided between the end of the assembled emulated single piece of inserted content and the re-entry point of the at least one main program.

7. The method of claim 1 wherein, the assembly of the selected at least two pieces of inserted content into an assembled emulated single piece of inserted content is performed such that no discontinuity occurs between the end of the assembled emulated single piece of inserted content and the re-entry point of the at least one main program and wherein a discontinuity indicator is provided between the start of the assembled emulated single piece of content and the break point of the at least one main program.

8. The method of claim 1 wherein, the assembly of the selected at least two pieces of inserted content into an assembled emulated single piece of inserted content is performed such that no discontinuity occurs between the break point of the at least one main program and a selected point in the assembled emulated single piece of inserted content and such that no discontinuity occurs between the selected point in the assembled emulated single piece of inserted content and the re-entry point of the at least one main program and wherein a discontinuity indicator is provided at the selected point in the assembled emulated single piece of inserted content and wherein the assembled emulated single piece of content is processed to have consistent sequencing information between the break point of the at least one main program and the discontinuity indicator and between the discontinuity indicator and the re-entry point of the at least one main program.

9. The method of claim 1 wherein, the assembly of the selected at least two pieces of inserted content into an assembled emulated single piece of inserted content is performed such that no discontinuity occurs between the breakpoint of the at least one main program and the start of the assembled emulated single piece of inserted content and further comprising the step of processing the re-entry point of the at least one main program and the remainder of the at least one main program such that no discontinuity occurs between the end of the assembled emulated single piece of inserted content and the processed portion of the at least one main program.

10. A system for dynamically selecting, assembling and inserting content into streaming media, comprising:
a program management system operable to respond to a request from a rendering device to provide a manifest defining a streaming media program comprising at least one main program and at least one duration, between a breakpoint in the at least one main program and a re-entry point in the at least one main program, where inserted content is to be inserted, the manifest including identifiers to identify the at least one main program and identifiers to indentify the at least one duration;
a content delivery network operable to provide the at least one main program to the rendering device in response to requests identifying the at least one main program with the corresponding identifiers in the manifest; and
a dynamic content decisioning system operable, in response to requests identifying the at least one duration with the corresponding identifiers in the manifest, to select at least two pieces of inserted content whose total duration equals the at least one duration and to provide an assembled emulated single piece of content comprising the selected at least two pieces of inserted content processed to have consistent sequencing information between a discontinuity indicator in the manifest and one of the breakpoint and the re-entry point of the at least one main program and to provide that assembled emulated single piece of content.

11. The system of claim 10 further comprising a dynamic content delivery server operable to deliver the received assembled emulated single piece of content to the rendering device in response to the requests identifying the at least one duration.

12. The system of claim 10 wherein the identifiers in the manifest identifying the at least one main program are URIs and the identifiers in the manifest identifying the at least one duration are meta URIs.

13. The system of claim 12 wherein the URIs are constructed at the rendering device from a URI template provided in the manifest.

14. The system of claim 10 wherein a first discontinuity indicator is provided in the manifest between the breakpoint in the at least one main program and the start of the at least one duration and a second discontinuity indicator is provided between the end of the at least one duration and the assembled emulated single piece of content is processed to have consistent sequencing information between the first discontinuity indicator and the second discontinuity indicator.

15. The system of claim 10 wherein the assembled emulated single piece of content is created such that no discontinuity occurs between the break point of the at least one main program and the start of the at least one duration and wherein a discontinuity indicator is provided between the end of the at least one duration and the re-entry point of the at least one main program.

16. The system of claim 10 wherein the assembled emulated single piece of content is created such that no discontinuity occurs between the end of the at least one duration and the re-entry point of the at least one main program and wherein a discontinuity indicator is provided between the start of the at least one duration and the break point of the at least one main program.

17. The system of claim 10 wherein the assembled emulated single piece of content is created such that no discontinuity occurs between the break point of the at least one main program and a selected point in the assembled emulated single piece of inserted content and such that no discontinuity occurs between the selected point in the assembled emulated single piece of inserted content and the re-entry point of the at least one main program and wherein a discontinuity indicator is provided at the selected point in the assembled emulated single piece of inserted content and wherein the assembled emulated single piece of content is processed to have consistent sequencing information between the break point of the at least one main program and the discontinuity indicator and between the discontinuity indicator and the re-entry point of the at least one main program.

18. The system of claim 10 wherein the assembled emulated single piece of content is created such that no discontinuity occurs between the break point of the at least one main program and the start of the assembled emulated single piece of inserted content and the content decisioning system processing the re-entry point of the at least one main program and the remainder of the at least one main program such that no discontinuity occurs between the end of the assembled emulated single piece of inserted content and the processed portion of the at least one main program.

19. The system of claim 10 wherein at least one assembled emulated single piece of content is assembled and stored before receiving the request from a rendering device and the dynamic content decisioning system selects an assembled emulated single piece of content to be provided to the rendering device from the stored at least one assembled emulated single piece of content.

\* \* \* \* \*